(12) United States Patent
Sann et al.

(10) Patent No.: US 8,840,787 B2
(45) Date of Patent: Sep. 23, 2014

(54) FILTER DEVICE, IN PARTICULAR RETURN LINE SUCTION FILTER, AND FILTER ELEMENT FOR USE IN SUCH A FILTER DEVICE

(75) Inventors: Norbert Sann, Riegelsberg (DE); Hans-Peter Eberle, Sulzbach (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 86 days.

(21) Appl. No.: 13/138,634

(22) PCT Filed: Jan. 20, 2010

(86) PCT No.: PCT/EP2010/000321
§ 371 (c)(1),
(2), (4) Date: Sep. 30, 2011

(87) PCT Pub. No.: WO2010/102690
PCT Pub. Date: Sep. 16, 2010

(65) Prior Publication Data
US 2012/0018359 A1 Jan. 26, 2012

(30) Foreign Application Priority Data

Mar. 13, 2009 (DE) .......................... 10 2009 013 070

(51) Int. Cl.
| | | |
|---|---|---|
| B01D 35/14 | (2006.01) | |
| B01D 35/30 | (2006.01) | |
| B01D 35/147 | (2006.01) | |
| B01D 29/13 | (2006.01) | |
| B01D 35/027 | (2006.01) | |
| F01M 11/03 | (2006.01) | |

(52) U.S. Cl.
CPC ...... B01D 35/0276 (2013.01); *B01D 2201/295* (2013.01); *B01D 2201/4046* (2013.01); *B01D 2201/4076* (2013.01)

USPC .......... 210/232; 210/130; 210/133; 210/136; 210/167.01; 210/167.02; 210/172.1; 210/172.6; 210/236; 210/435; 210/437; 210/450; 210/451; 210/455; 210/457

(58) Field of Classification Search
None
See application file for complete search history.

(56) References Cited

U.S. PATENT DOCUMENTS

| | | | | |
|---|---|---|---|---|
| 4,133,763 | A | * | 1/1979 | Cooper ........................ 210/232 |
| 6,733,666 | B1 | * | 5/2004 | Wilkendorf et al. .......... 210/130 |
| 6,843,377 | B1 | | 1/2005 | Roll |

(Continued)

FOREIGN PATENT DOCUMENTS

| | | | |
|---|---|---|---|
| DE | 11 2006 003 021 | | 10/2008 |
| EP | 1 281 426 | | 2/2003 |
| WO | WO 2006/012031 | * | 2/2006 |

*Primary Examiner* — Benjamin Kurtz
(74) *Attorney, Agent, or Firm* — Roylance, Abrams, Berdo and Goodman LLP

(57) ABSTRACT

A filter device, in particular a return line suction filter, has at least one filter housing (3) receiving a filter element (17) defining a longitudinal axis. The filter element has an end cap with an enclosure at one filter element end enclosing an end edge of the filter material (39) and fixed to an element receptacle (5) connected to the filter housing (3) for fixing the location of the filter element (17) in its functional position. The element receptacle (5) and the associated end cap (21) of the filter element (17) have design irregularities (63, 65) adapted to each other at their parts (23, 47) engaging each other in the functional position of the filter element (17). The irregularities enable the engagement in a positional alignment to each other.

15 Claims, 4 Drawing Sheets

(56) References Cited

U.S. PATENT DOCUMENTS

| | | | |
|---|---|---|---|
| 7,662,284 B2* | 2/2010 | Greco et al. | 210/234 |
| 8,444,735 B2* | 5/2013 | Coulonvaux et al. | 55/498 |
| 2003/0024870 A1* | 2/2003 | Reinhart | 210/443 |
| 2005/0161386 A1 | 7/2005 | Gustafson et al. | |
| 2006/0054547 A1 | 3/2006 | Richmond et al. | |
| 2010/0025317 A1* | 2/2010 | Fall et al. | 210/237 |

* cited by examiner

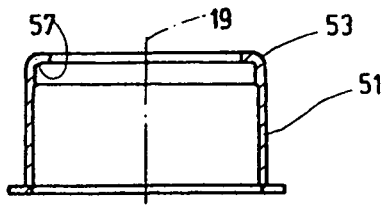
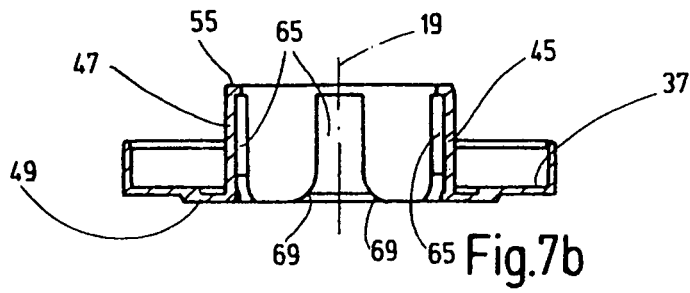
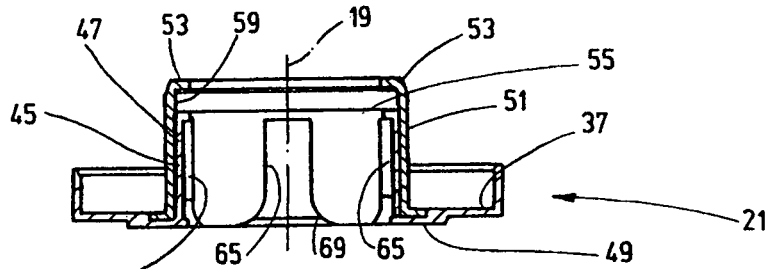
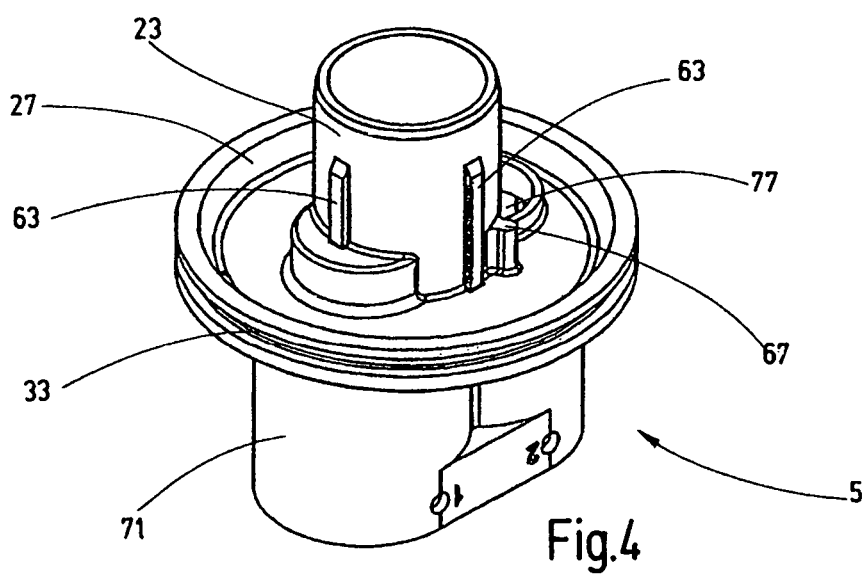

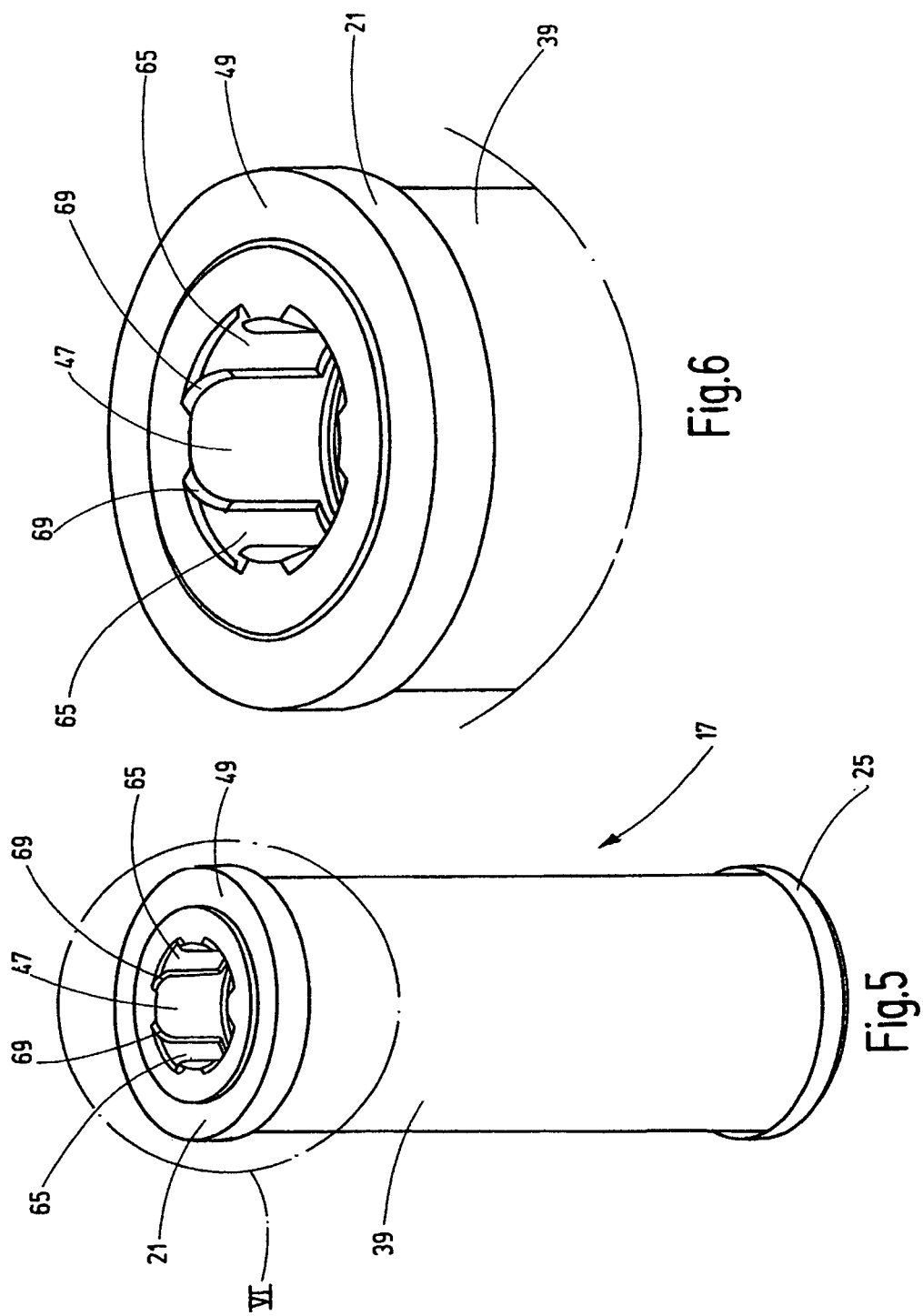

FILTER DEVICE, IN PARTICULAR RETURN LINE SUCTION FILTER, AND FILTER ELEMENT FOR USE IN SUCH A FILTER DEVICE

FIELD OF THE INVENTION

The invention relates to a filter device, in particular a return line suction filter, having at least one filter housing. At least one filter element defines a longitudinal axis, is in the form of a filter cartridge and is accommodated in the filter housing. The cartridge on at least one end has an end cap forming an enclosure for the pertinent end edge of the filter material and fixable on an element receptacle connected to the filter housing for fixing the filter element in its operating position. Moreover, the invention relates to a filter element for such a filter device.

BACKGROUND OF THE INVENTION

Filter devices of this type are readily available commercially in different designs. To a large extent, these filter devices are used for filtration of working fluids, such as hydraulic fluids, fuels, lubricants, and the like. Such device in the form of a suction filter is described, for example, in brochure D7.108.2/06.07 of Hydac Filtertechnik GmbH with the product description of RKM return line suction filter, and is commercially available in different pressure stages (up to 10 bar) and for different return volumetric flows (up to 800 l/min).

Return line suction filters are used in hydraulic systems in those cases in which there are both an open hydraulic circuit (for example, working hydraulics) and a closed hydrostatic system (for example, traction drive) in the system. In this connection, return line suction filters can perform both the function of the return line filter of the open circuit and the function of the suction filter of the closed circuit (drive), provided that the return flow of the open hydraulic system is not less than the volumetric flow of the feed pump for the hydrostatic system. In fluid systems, specifically hydraulic systems, in which filter devices are used, the operating reliability of the system depends largely on the reliable operation of the filter device located in the system. In other words, failure of the filter device, beyond the failure of the pertinent system, can lead to serious damage to the system and thus can cause significant financial losses.

SUMMARY OF THE INVENTION

An object of the invention is to an improved filter device characterized by special operating reliability.

This object is basically achieved according to the invention by a filter device having design irregularities formed both on the element receptacle of the pertinent filter housing and on parts of the end cap of the filter element assigned to the element receptacle. The design irregularities on the element receptacle and on the end cap are matched to one another such that if they are aligned to one another, they enable mutual engagement. In this way a pertinent filter element can be moved into the operating position only when complementary design features on the element receptacle and end cap are matched to one another. They then allow the engagement with the corresponding mutual alignment. The filter device can be operated only with a filter element intended for a respective special use and satisfying the pertinent applicable specifications, thereby ensuring operating reliability.

This arrangement not only precludes that a filter element will be used which has an unsuitable filter fineness or which is not suitable for the respective application, that is to say, is not assigned to a corresponding pressure stage, but that the risk will also be avoided that possibly a "low-end element" available on the market will be used which does not meet the applicable safety standards.

To enable mutual engagement, a positional relation is necessary in which the design irregularities have a positional relation aligned to one another. An additional advantage is that the engagement between element receptacle and end cap forms a locking element. Even for a tangential flow occurring in a filter housing, the filter element is then supported against a possible torque around the longitudinal axis.

In preferred exemplary embodiments, the filter housing has the shape of a cup. From the cup top the filter element can be inserted and can be fixed on the element receptacle, forming a housing bottom part. In filter housings with this type of design, a housing cover typically forms the upper termination of the housing and a support for the upper end cap of the filter element. Accordingly, the housing cover can be screwed to the top end of the filter housing or bolted to it, only if the filter element is properly engaged with the element receptacle on the bottom part of the housing. An attempt to inadvertently install an "incorrect" filter element is thus immediately conspicuously indicated to the operator.

Preferably, the bottom part forming the element receptacle has a pipe socket projecting coaxially from its top and extending into the inner filter cavity of the filter element that is in the operating position to form a fluid connection. The pipe socket on the outer peripheral side has the design irregularities belonging to the element receptacle.

To fix the filter element on an element receptacle designed in this way, the end cap can have a coaxial connector extending into the inner filter cavity surrounded by a fluid-permeable support pipe and engaged by the pipe socket of the element receptacle in the operating position of the filter element. The design irregularities belonging to the end cap are located on the inner wall of the connector of the end cap.

In especially advantageous exemplary embodiments, the design irregularities on the pipe socket of the element receptacle have at least one radially projecting rib extending in the longitudinal direction and having a depression assigned which extends in the longitudinal direction in the inner wall of the connector of the end cap.

Especially effective protection against confusion exists when there are several longitudinal ribs distributed around the periphery of the pipe socket of the element receptacle and several depressions assigned to the ribs in the connector of the end cap. For this reason, depending on the distribution pattern of the arrangement of the ribs and depressions, only specially adapted filter elements can be used.

In advantageous exemplary embodiments, the end cap is composed of an inner sleeve body concentric to the longitudinal axis, forming the inner wall of the connector with the depressions located in it, and integral with a peripheral annular member forming the enclosure for the end edge of the filter material. An outer sleeve surrounds the sleeve body and has an outside forming a contact surface for the support pipe of the filter element. This two-part construction of the end cap is advantageous with respect to production with press-molded plastic parts.

If, in this connection, the outer sleeve forms a hollow cylinder whose axial length is greater than that of the inner sleeve body, so that the inner end edge of the outer sleeve projects over the end edge of the sleeve body and so that the end edge of the outer sleeve forms an end part drawn radially to the inside, this end part together with the adjacent end edge of the sleeve body can border an annular groove-like space used as a seat for an annular sealing element. This execution of the end cap thus enables perfect sealing of the inner filter cavity on the bottom part of the housing, and thus, sealing of the inner filter cavity forming the clean side in the filter process relative to the dirty side located on the outside of the filter element.

Preferably, the bottom part forming the element receptacle on the bottom facing away from the pipe socket forms a valve housing part integrally molded on and having an outlet connectable to the tank side of a hydraulic system. In this way, a bypass valve and valve arrangements as are used, for example, in return line suction filters can be easily integrated mechanically into the bottom part.

In this respect, in the bottom part there can be a first fluid passage leading to a bypass valve located in the valve housing from the dirty side of the filter element. In the operating position, the fluid passage bypasses the pipe socket. A second fluid passage can lead from the pipe socket to at least one other valve located in the valve housing, such as an anti-cavitation valve and/or back pressure valve, which valve or valves is or are connected to the outlet.

The subject matter of the invention is also a filter element for use in a filter device according to the invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 4 is a perspective view of only the housing bottom part of the filter device of FIG. 1 forming an element receptacle;

FIG. 5 is a perspective view of a filter element for use in the filter device of FIG. 1, viewed looking at its end cap which interacts with the element receptacle;

FIG. 6 a partial perspective view of only the region designated as VI in FIG. 5, drawn on a larger scale than FIG. 5; and FIGS. 7a to 7c are side elevational views in sections of only the parts of the end cap of the filter element which interact with the element receptacle of FIGS. 5 and 6, with FIG. 7c showing the end cap in the assembled state.

DETAILED DESCRIPTION OF THE INVENTION

Figure 1:
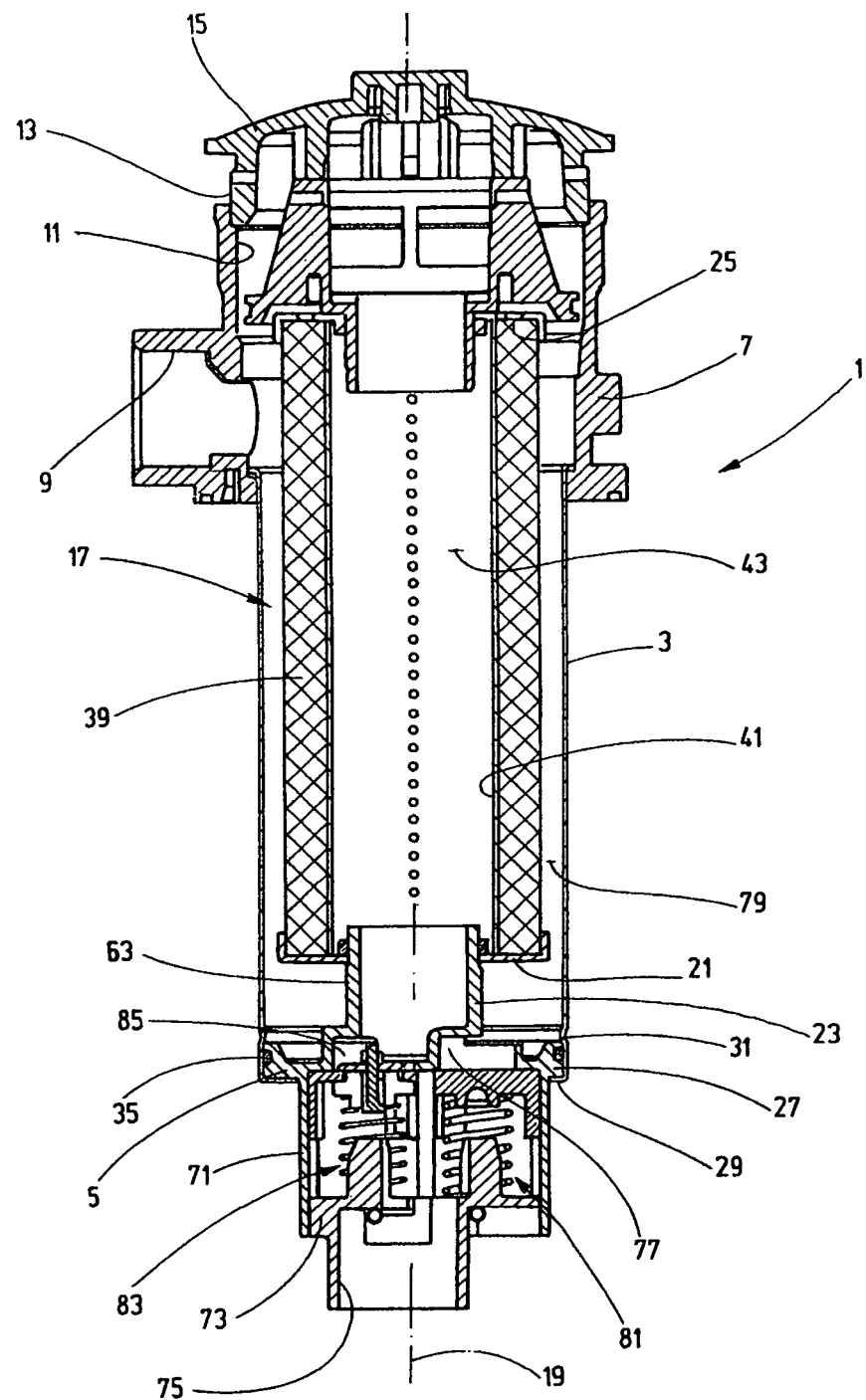
FIG. 1 is a side elevational view in section of a filter device according to an exemplary embodiment of the invention, with an attempt being made to bring a filter element that is not suitable for use into the operating position in the filter housing.

A filter housing 1 has a hollow cylindrical main part 3 which on its bottom side end is sealed by a housing bottom part 5. The upper end of the main part 3 is adjoined by a housing top part 7. In the manner conventional for these filter housings, top part 7 has fluid guides, of which the drawings show a fluid inlet 9 via which fluid to be cleaned can be supplied to the space in the filter housing 1 forming the dirty side in the filter process. Another fluid guide is provided in the top part 7, is connected to the space forming the clean side in the filter process, and leads to an outlet for the emergence of cleaned fluid from the housing top part 7. This outlet is not shown in the drawings since it is turned by 90 degrees relative to the plane of the drawings. On the top end of the housing top part 7, an internal thread 11 is provided to threadedly engage the external thread 13 of a housing cover 15. FIG. 1 shows that the housing cover 15 is in a position raised off the top part 7 and in which the internal thread 11 and external thread 13 do not engage.

The filter housing 1 can accommodate a filter element 17 in the form of a filter cartridge. With the housing cover 15 removed, filter element 17 can be inserted into the filter housing 1 from the open end of the housing top part 7 along the longitudinal axis 19. For fixing of the filter element 17 in its operating position, the bottom part 5 forms an element receptacle which interacts with the bottom side end cap 21 of the filter element 17. As the main part of the element receptacle, the bottom part 5 has a pipe socket 23 projecting axially away from the bottom part 5 in the direction to the housing top part 7 and being concentric to the axis 19. FIG. 1 shows a state in which the filter element 17 with its end cap cannot be slipped far enough onto the pipe socket 23, but is blocked in the position shown in FIG. 1 as a result of the shape of the pipe socket 23. In this position of the filter element 17, the housing top part 7 cannot be closed by the housing cover 5 because the housing cover 15 adjoining the cover-side end cap 25 of the filter element 17 is held by the housing top part 7 at a distance at which the internal thread 11 and external thread 13 cannot engage.

FIG. 4 shows details of the shaping of the bottom part 5. It is connected by its circular ring-shaped peripheral edge in the form of an annular member 27 to the bottom end of the housing main part 3. The bottom end 29 of the main part 3 formed by a steel pipe encompasses the annular member 27. On the top edge of the annular member 27, a flanged site 31 is formed. In the outer periphery of the annular member 27, there is an annular groove 33 for a gasket 35 for sealing between the bottom part 5 and housing main part 3.

Figures 2, 3:
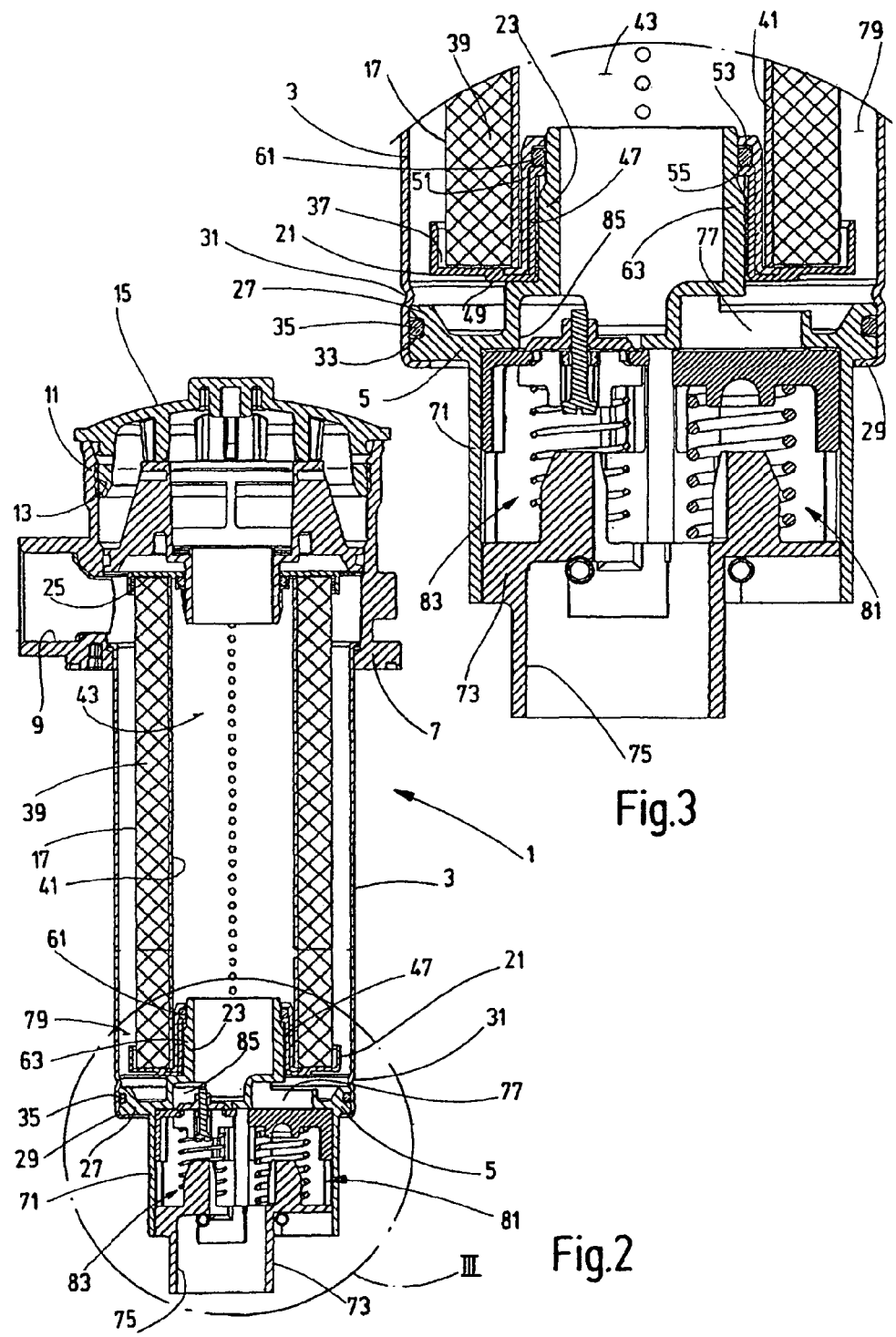
FIG. 2 is a side elevational view in section, drawn on a slightly smaller scale than FIG. 1, of the filter device of FIG. 1 with a filter element in the operating position.
FIG. 3 is a partial side elevational view in section of the region designated as III in FIG. 2, drawn on a larger scale than FIG. 2.

FIGS. 2 to 7a-c illustrate details of the configuration both of the bottom part 5 and also of the assigned end cap 21 of the filter element 17 suitable for use in the filter device. As is apparent from FIGS. 5 to 7a-c, the end cap 21 forms an annulus 37 as enclosure for one end edge of the filter material 39 of the filter element 17. Filter material 39 surrounds a support pipe 41. The support pipe 41 borders the internal filter cavity forming the clean side in the filter process in the filter element 17. As FIGS. 7a to 7c show, the end cap 21 has a two-part construction, including an inner sleeve body 45, which is concentric to the axis 19 and which on its inside forms the inner wall of a concentric connector 47. Connector 47 projects axially away from the bottom 49 of the annulus 37 and into the inner filter cavity 43. The end cap 21 is completed by an outer sleeve 51 shown separately in FIG. 7a, which is slipped over the outside of the connector 47. As shown in FIGS. 2 and 3, outer sleeve 51 is in contact on its outside with the support pipe 41. As FIG. 7c shows, the axial length of the outer sleeve 51 is larger than that of the connector 47 so that the inner end edge 53 of the outer sleeve 51 in the assembled state of FIG. 7c projects over the end edge 55 of the connector 47. Therefore, the end edge 53, with an end part 57, drawn radially to the inside, forms a seat 59 (FIG. 7c) for a gasket 61, see FIGS. 3 and 2.

As FIG. 4 shows best, on the outer periphery of the pipe socket 23, which forms the main part of the element receptacle of the bottom part 5, radially projecting longitudinal ribs 63 are molded. In this example, four ribs at uniform angular distances are provided with only two being shown in FIG. 4. To enable the engagement between the connector 47 of the end cap 21 and the pipe socket 23, the inner wall of the connector 47, as design irregularities complementary to the longitudinal ribs 63, has depressions 65 in the inner wall of the connector 47. These depressions 65 are in complementary arrangement to the longitudinal ribs 63 of the pipe socket 23 and make it possible for the filter element 17 with its end cap 21 to be able to be slipped onto the pipe socket 23 until the bottom 49 of the end cap 21 makes contact with spacers 67 (FIG. 4) of the element receptacle and for the filter element 17 to be in its operating position. Here, as FIG. 3 shows best, the inner filter cavity 43 (clean side) is sealed by a gasket 61 relative to the element receptacle on the pipe socket 23.

The depressions 63, see FIGS. 5, 6 as well as 7b and 7c, have a greater width in the peripheral direction than the longitudinal ribs 63 on the pipe socket 23 of the element receptacle, so that the longitudinal ribs 63 and the depressions 65 can easily be moved toward one another when the filter element 17 is moved into the operating position. Also, the filter element 17 can be removed without obstacles when the element is being changed. Thus, the radial travel path produced in this respect can be used to loosen a possibly fixed seal in which the seal is entrained at least some distance of this travel path. This moving together is moreover facilitated by the depressions 65 on the open end, i.e., on the bottom 49 of the end cap 21, each having an arc-shaped widening 69.

Instead of the complementary design irregularities formed by longitudinal ribs 63 and depressions 65, differently shaped configurations in any pattern arrangement on the element receptacle (pipe socket 23) and end cap 21 can be provided. The assignment of radially projecting and radially recessed elements could also be chosen to be the reverse of this example so that, for example, there could be longitudinal ribs on the end cap 21 and depressions on the pipe socket 23 of the element receptacle.

FIGS. 1 to 4 show that the bottom part 5 forming the element receptacle on its bottom facing away from the pipe socket 23 has a housing part 71 molded on in one piece. Together with an outlet part 73, part 71 forming the housing termination forms a valve housing.

The outlet part 73 in turn forms an outlet 75 which can be connected to the tank side of an assigned hydraulic system (not shown). A fluid passage 77 located in the bottom part 5 connects the space 79 of the filter element 17 which space 79 in the operating position forms the dirty side in the filter process, to a bypass valve 81 in the valve housing 71, 73 to enable a pressure decrease from the fluid passage 77 to the tank-side outlet 75 with pressure actuation. When using the exemplary embodiment of the filter device described here as a return line suction filter, within the valve housing 71, 73 and in the fluid connection to the outlet 75, another valve arrangement 83 in the form of a combined anti-cavitation valve and back pressure valve is inserted between a second fluid passage 85 in the bottom part 5. Second fluid passage 85 is connected to the inner filter cavity 43 forming the clean side, and the tank-side outlet 75.

While one embodiment has been chosen to illustrate the invention, it will be understood by those skilled in the art that various changes and modifications can be made therein without departing from the scope of the invention as defined in the appended claims.

What is claimed is:
1. A filter device, comprising:
at least one filter housing;
at least one filter cartridge received in said filter housing and extending along a longitudinal axis, said filter cartridge having an end cap on at least one end thereof and filter material with an end edge, said end cap including an enclosure for said end edge, including a connector housing an inner wall with depressions therein and including a bottom, said end cap having an inner sleeve body and an outer sleeve, said inner sleeve body being concentric to said longitudinal axis and forming said inner wall of said connector, said outer sleeve including a hollow cylinder having an axial length greater than an axial length of said inner sleeve body and including an inner end edge projecting over an end edge of said inner sleeve body, said inner end edge of said outer sleeve having an end part extending radially inwardly toward said longitudinal axis adjacent said end edge of said inner sleeve body to border an annular groove between said end part and said end edge of said inner sleeve body, said annular groove seating an annular sealing element; and
an element receptacle connected to said filter housing and fixing said filter cartridge in an operating position, said element receptacle having a pipe socket with longitudinal ribs thereon and having spacers engaged with said end cap in the operating position, said depressions and said ribs engaging one another in the operating position to positionally align said filter cartridge with said element receptacle, each said depression having a width greater than a width of each said rib in peripheral direction of said connector and said pipe socket permitting said filter cartridge with said end cap to be slipped onto said pipe socket until said bottom of said end cap contacts said spacers in the operating position.

2. A filter device according to claim 1 wherein
said filter housing has a cup shape with a top opening for insertion of said filter cartridge into said filter housing, said element receptacle forming a housing bottom part of said filter housing.

3. A filter device according to claim 2 wherein
said pipe socket projects coaxially from a top of said pipe socket extending into an inner cavity of said filter cartridge in the operating position relative to said longitudinal axis and forms a fluid connection with said inner cavity, said ribs being on an outer peripheral surface of said pipe socket.

4. A filter device according to claim 3 wherein
said connector extends coaxially into said inner cavity and engages said pipe socket in the operating position, said inner cavity being surrounded by a fluid-permeable support pipe of said filter cartridge.

5. A filter device according to claim 4 wherein
said ribs project radially from said pipe socket; and
said depressions extend in a longitudinal direction of said inner wall.

6. A filter device according to claim 5 wherein
said ribs are distributed around a periphery of said pipe socket; and
said depressions are distributed about a periphery of said inner wall.

7. A filter device according to claim 6 wherein
said inner sleeve body comprises a peripheral annular member forming said enclosure for said end edge of said filter material, said outer sleeve surrounding said inner sleeve body and having an outer contact surface engaging said support pipe of said filter cartridge.

8. A filter device according to claim 3 wherein
said housing bottom part comprises a valve housing part facing away from said pipe socket and being integrally molded on said housing bottom part, said valve housing part having an outlet connectable to a tank side of a hydraulic system.

9. A filter device according to claim 8 wherein
said housing bottom part comprises a first fluid passage leading to a bypass valve located in said valve housing part and extending from a dirty side of said filter cartridge and bypassing said pipe socket, and comprises a second fluid passage leading from said pipe socket to at least one other valve located in said valve housing part.

10. A filter device according to claim 9 wherein
said other valve comprises at least one of an anti-cavitation valve and a back pressure valve connected to said outlet.

11. A filter element, comprising:
filter material extending along a longitudinal axis with first and second opposite end edges; and
an end cap having an enclosure on and enclosing said first end edge and having a connector including an inner wall with depressions therein, said end cap being engageable with an element receptacle in a filter housing for fixing the filter element in an operating position by said depressions engaging longitudinal ribs of a pipe socket of the element receptacle to positionally align the filter element with the element receptacle, each said depression having a width greater than a width of each of the ribs in peripheral direction of said connector and the pipe socket permitting the filter element with said end cap to be slipped onto the pipe socket until said end cap contacts spacers on the element receptacle, said end cap having an inner sleeve body and an outer sleeve, said inner sleeve body being concentric to said longitudinal axis and forming said inner wall of said connector, said outer sleeve including a hollow cylinder having an axial length greater than a axial length of said inner sleeve body and including an inner end edge projecting over an end edge of said inner sleeve body, said inner end edge of said outer sleeve having an end part extending radially inwardly toward said longitudinal axis adjacent said end edge of said inner sleeve body to border an annular groove between said end part and said end edge of said inner sleeve body, said annular groove seating an annular sealing element.

12. A filter element according to claim 11 wherein
said connector extends coaxially into an inner cavity of said filter material, said inner cavity being surrounded by a fluid-permeable support pipe.

13. A filter element according to claim 12 wherein
said depressions extend in a longitudinal direction of said inner wall.

14. A filter element according to claim 13 wherein said depressions are distributed about a periphery of said inner wall.

15. A filter element according to claim 14 wherein
said inner sleeve body comprises a peripheral annular member forming said enclosure for said end edge of said filter material, said outer sleeve surrounding said inner sleeve body and having an outer contact surface engaging said support pipe of said filter cartridge.

* * * * *